(12) United States Patent  (10) Patent No.: US 9,114,559 B2
Finger et al.  (45) Date of Patent: Aug. 25, 2015

(54) STRETCH-BLOW MOLDING MACHINE

(71) Applicant: KRONES AG, Neutraubling (DE)

(72) Inventors: Dieter Finger, Neutraubling (DE); Florian Geltinger, Donaustauf (DE); Helmut Schneider, Regensburg (DE)

(73) Assignee: KRONES AG, Neutraubling (DE)

( * ) Notice: Subject to any disclaimer, the term of this patent is extended or adjusted under 35 U.S.C. 154(b) by 12 days.

(21) Appl. No.: 14/089,490

(22) Filed: Nov. 25, 2013

(65) Prior Publication Data

US 2014/0079839 A1    Mar. 20, 2014

Related U.S. Application Data

(62) Division of application No. 13/093,001, filed on Apr. 25, 2011, now abandoned.

(30) Foreign Application Priority Data

Apr. 27, 2010  (DE) .................. 10 2010 028 255

(51) Int. Cl.
*B29C 49/12* (2006.01)
*B29C 49/42* (2006.01)
(Continued)

(52) U.S. Cl.
CPC ............. *B29C 49/12* (2013.01); *B29C 49/42* (2013.01); *B29C 49/78* (2013.01); *B29C 49/06* (2013.01);
(Continued)

(58) Field of Classification Search
CPC .............. B29C 2949/78882; B29C 49/12; B29C 2049/129; B29C 2049/1204; B29C 2049/1257; B29C 2049/1271
See application file for complete search history.

(56) References Cited

U.S. PATENT DOCUMENTS 6,186,760 B1    2/2001  Latham
6,576,171 B1 *  6/2003  Devenoges .................. 264/40.1
(Continued)

FOREIGN PATENT DOCUMENTS

CN    1726122 A    1/2006
CN    200977723 Y  11/2007
(Continued)

OTHER PUBLICATIONS

Partial machine translation of DE 102008012757 A1 dated Sep. 10, 2009 obtained from the espacenet website.*
Search Report for German Application No. 10 2010 028 255.3 dated Nov. 2, 2010.
Notification of the First Office Action, The State Intellectual Property of the People's Republic of China, Application No. 201110111909.5, dated May 31, 2013.

*Primary Examiner* — Robert B Davis
(74) *Attorney, Agent, or Firm* — Marshall, Gerstein & Borun LLP

(57) ABSTRACT

A stretch-blow molding machine having at least one blow molding station, in which a split blow mold, an adjustable blow nozzle with a valve section, a stretching rod with a stretching rod drive system, and an electronic control unit are provided, the electronic control unit arranged in the blow molding station is equipped with hardware and software for selectively operating the blow molding station with a combination of a cam drive and a pneumatic drive, or a combination of an electric servo drive and a pneumatic drive, or only an electric servo drive in the stretching rod drive system. The movement of the stretching rod is initiated in the stretch-blow molding machine in the production process of a container by means of an electric servomotor with the beginning of or during the locking phase of the blow mold and before the blow nozzle is placed, and the stretching rod is already displaced to a position in which the stretching rod is either very closely approached to the preform bottom or contacts the preform bottom, or has even already pre-stretched the preform, until the blow nozzle is placed.

24 Claims, 4 Drawing Sheets

(51) Int. Cl.
  *B29C 49/78* (2006.01)
  *B29C 49/32* (2006.01)
  *B29C 49/06* (2006.01)

(52) U.S. Cl.
  CPC ......... *B29C 49/32* (2013.01); *B29C 2049/1204* (2013.01); *B29C 2049/129* (2013.01); *B29C 2049/1257* (2013.01); *B29C 2049/1271* (2013.01)

(56) References Cited

U.S. PATENT DOCUMENTS

| | | | |
|---|---|---|---|
| 7,314,360 B2 | 1/2008 | Koda et al. | |
| 2010/0078861 A1* | 4/2010 | Herklotz et al. | 264/532 |
| 2011/0037189 A1 | 2/2011 | Balkau et al. | |
| 2011/0260373 A1 | 10/2011 | Finger et al. | |

FOREIGN PATENT DOCUMENTS

| | | |
|---|---|---|
| CN | 101138885 A | 3/2008 |
| DE | 69901814 T2 | 1/2003 |
| DE | 102007008023 A1 | 8/2008 |
| DE | 102008012757 A1 | 9/2009 |
| DE | 102008013419 A1 | 9/2009 |
| EP | 0577384 A1 | 1/1994 |
| EP | 1066149 A1 | 1/2001 |
| EP | 2186619 A1 | 5/2010 |
| JP | 2006305000 A | 11/2006 |
| JP | 2007261150 A | 10/2007 |
| WO | WO-2008/098565 A2 | 8/2008 |

* cited by examiner

STRETCH-BLOW MOLDING MACHINE

CROSS-REFERENCE TO RELATED APPLICATION

The present application is a divisional of U.S. patent application Ser. No. 13/093,001 filed Apr. 25, 2011, which claims the benefit of priority of German Patent Application No. 102010028255.3 filed Apr. 27, 2010. The entire text of each of the US and the German priority applications is incorporated herein by reference.

FIELD OF THE DISCLOSURE

The disclosure relates to a stretch-blow molding machine as well as to a method of stretch-blow molding containers.

BACKGROUND

In the stretch-blow molding machine known from DE 10 2008 012 757 A (rotary machine), an electronic control unit in the rotating part is associated to each blow molding station and controls the stretching rod movement as well as the blow pressure and valve control to be able to quickly adapt the control for the production process when the product is changed. The control units in the rotating part are linked via a bus system and connected to a master control device outside the rotating part. Each blow molding station can have a timer to perform angle-independent control. The positions the stretching rod passes in the production process can be stored in recipes for different types of containers. The stretching speed can be freely parameterized independent of the production speed. Each control unit can comprise a servo frequency converter and does not only control the electric stretching, but ideally also all functions of the blow molding station. A cycle is initiated by a starting signal and is then timed-controlled. In each control unit, a computer program is so to speak processed. A time-dependent stretching progress can be stored in the control unit. The electric servomotor for the stretching rod control is a rotating frequency converter motor, where frequency conversion can also take care of the control of the valves. The electric servomotor drives a stretching slide supporting the stretching rod over a belt. The rotating part is supplied with the operating media by at least one rotary transmission leadthrough between the rotating and the stationary part.

Furthermore, stretch-blow molding machines in which the movement of the stretching rod is controlled by cam control combined with at least one pneumatic cylinder in each blow molding station are known in practice. It is furthermore known from practice to combine the electric servomotor with a pneumatic cylinder also in electric stretching.

From EP 1 066 149 B, a stretch-blow molding machine whose blow molding stations are disposed stationarily is known. The stretching rod drive system works with an electric servomotor which drives the stretching slide supporting the stretching rod via a sprocket belt and causes the movement of the stretching rod in a path-controlled or force-controlled manner over time. One electronic control unit is associated to each blow molding station, which optionally comprises several blow molds, where the control unit controls the movement of the stretching rod and the application of blow pressure in closed control loops. According to the method, suited curves can be selected from different stored curves among the stretching rod path over time, the stretching rod force over time, or the blow nozzle pressure over time, and then processed. In the path-controlled stretching rod movement, at most one change of speed is performed. Before the start of production, first and second calibrations of the stretching rod control that will be accomplished later in the production process are carried out slowly, and their results are stored. In the first calibration, the stroke distance of the stretching rod up to a distance from the mold cavity bottom corresponding to the thickness of the bottle bottom is determined, i.e. optionally including an after-pressure path for the preform bottom. In the second calibration, the stroke distance of the stretching rod to the preform bottom of the cold preform minus a stroke increment for e.g. temperature-related deformations of hot preforms are determined. Based on the calibrations, the control loops generate for example time-related stroke curves for the actual production process. Similarly, time-related pressure curves for a preblow and a final blow phase can also be generated.

In a known method, for example in a stretch-blow molding machine with a combination of cam control and a pneumatic drive in the stretching rod drive system, the course of movement of the stretching rod is carried out as a first process step before the preblow phase. This first process step, however, can only be carried out when the free end of the stretching rod contacts the preform bottom. The preblow phase, however, cannot be started before the blow nozzle has been placed onto the preform mouth in a sealing manner. With the cam control, the stretching rod cannot have performed a relatively short stroke before the blow nozzle has been placed in a sealing manner. Only afterwards, the stretching rod can perform the further, possibly clearly longer stroke until it contacts the preform bottom, which involves a considerable idle time. Idle time means an essential non-utilized proportion of the process angle in the production process and is the longer, the longer the preform is. A longer stroke of the stretching rod already before the sealing time of the blow nozzle is not possible, as otherwise the stretching process will start too early in case of a short preform.

SUMMARY OF THE DISCLOSURE

One aspect of the present disclosure disclosure is to provide a stretch-blow molding machine of the type mentioned above which comprises inexpensive and universally applicable equipment, and to provide a method of stretch-blow molding containers by which idle times in the process flow can be reduced to a minimum or completely avoided.

The electronic control unit of the blow molding station can be inexpensively and universally utilized in different blow molding machines which differ, for example, in different stretching rod drive systems. This inexpensive and universally usable control unit can at least partially compensate the additional costs of equipment for electric stretching (philosophy of same parts with respect to the control unit).

According to the method, the idle time in the production operation is drastically reduced or completely eliminated, as the movement of the stretching rod is started already during the locking phase of the blow mold or at the latest with the beginning of the locking phase, so that the stretching rod is positioned at the preform bottom, or very close, for example only 1 mm, in front of the preform bottom, or even already performs pre-stretching before the blow nozzle is placed onto the preform mouth in a sealing manner. It is even conceivable in the method to have the stretching rod immerse in the preform already before the locking phase is started, for example as of the point in time at which a transfer arm with the preform enters the path section it has in common with the blow molding station or the blow mold, respectively. This means further saving of idle time and also permits to moderately control the rate of movement of the stretching rod because a relatively long period can be utilized to bring the free end of the stretching rod close to the preform bottom or into contact with the preform bottom, or to even pre-stretch the preform. This control of the stretching rod movement is particularly conveniently performed with the electric servomotor which accomplishes the positioning depending on the type of preform. The stretching rod can be initially very quickly accelerated and then decelerated to stretching speed by means of the electric servomotor, or for approaching it to the preform bottom, it can temporarily perform a very quick moving phase. This individual speed control of the stretching rod, conditioned by the performance of the electric servomotor, saves process time and nevertheless does not involve any hazard for the preform or the blow mold. The preform length or the stretching rod stroke until it comes into contact or nearly into contact with the preform bottom is read out from the control unit. The movement profile of the stretching rod movement can be designed individually by the electric servomotor and the control unit. The critical stroke length of the movement of the stretching rod or the length of the preform can be automatically determined by a reference point approach, or else be manually predetermined at the control unit, for example via a touch screen, or it can be transmitted to the individual control units via a decentralized external master control system, for example within a bus system. The reduction or the elimination of the idle time results in clearly increased production rates in the production operation.

In another preferred embodiment, during the stretching operation, the stretching rod is driven again to the upper position immediately after the final blow pressure has been applied. This has the advantage that the stretching drive only temporarily has to apply a force against the existing internal pressure in the blow mold or the preform, resulting in less dissipated power and improving the energetic overall image. However, it is also conceivable not to drive the stretching rod to the upper position until a later point in time. For example, in hotfill machines it is necessary to cool the inner wall of the bottle by means of the stretching rod which is why it has to remain in the lower position as long as possible.

In another preferred embodiment, one or several intermediate positions between the upper and the lower stop are approached in a reference point approach. For example, the blow nozzle slide could be entrained from a certain intermediate position. As this point of entrainment could vary due to wear or work tolerances, an automatic detection of this entrainment position permits an accurate and reproducible entrainment of the blow nozzle slide.

In the stretch-blow molding machine, the control unit can be provided only for controlling the stretching rod movement. Suitably, the control unit is additionally equipped with hardware and software technology which can be utilized in the blow molding station also for controlling the blow nozzle and/or the valve section, suitably in association to the stretching rod movement or in association of the stretching rod movement to the blow nozzle or valve section control. This remarkably reduces the control effort.

Suitably, the universally applicable control unit is associated to a blow molding station which is arranged in a part rotating relative to a stationary part of the stretch-blow molding machine, preferably in a blow-molding unit comprising several blow molding stations (rotary machine). However, this does not exclude the use of the control unit also for stretch-blow molding machines which comprise stationary blow molding stations, optionally each with several blow molds and stretching rods.

In one advantageous embodiment of the stretch-blow molding machine, the control unit is installed separately from the electric servomotor to avoid mutual heat couplings.

Suitably, at least one frequency converter of the electric servomotor (a rotary motor or a linear motor) is separated from the servomotor, preferably at a distance excluding heat couplings from the servomotor to the frequency converter or vice-versa. The frequency converter can even be installed at a central installation point containing several to all frequency converters for the blow molding stations of the stretch-blow molding machine. For example, the frequency converters are accommodated centrally in a preferably cooled switch cabinet. The switch cabinet can be separately cooled, for example by a liquid cooling system, or with at least one so-called cold plate which eliminates heat e.g. generated by the frequency converters. This results in long trouble-free service lives of the electric or electronic equipment.

In stretch-blow molding machines, electric servomotors, in particular also for electric stretching, are usually supplied with the supply voltage via frequency converters with intermediate circuits. The intermediate circuit voltage is conventionally generated by bridge rectifiers which apply an intermediate circuit voltage approximately corresponding to 1.4 times the input voltage. For example, with the usual mains voltage of 400 Volt, an intermediate circuit voltage of about 560 Volt is achieved. A disadvantage of this known system is that with different mains voltages in different countries, e.g. in the USA, different intermediate circuit voltages arise for the electric servomotors, which can possibly even result in country-specific motor designs. This disadvantage involves a considerable amount of dissipated power and unsuitably large cable cross sections, and torque drops or losses of the pushing and pulling forces can occur. This disadvantage can be avoided according to the disclosure in that the respective frequency converter, preferably in an intermediate circuit, comprises at least one closed-loop-controlled set-up switched-mode power supply by means of which the intermediate circuit voltage is increased and maintained at between approximately 600 to 900 Volt, preferably between 750 and 800 Volt, to supply the respective electric servomotor. By the closed-loop control and the set-up, the intermediate circuit voltage can be maintained independent of the mains voltage or nominal voltage. Independent of the respective country, the same types of servomotors which are adapted to this set up intermediate circuit voltage can always be used. By this, the nominal current can be lowered, resulting in less dissipated power and advantageously small cable cross sections. Moreover, such adapted electric servomotors can be operated e.g. at higher speeds, and force or torque drops are reliably excluded. The setting up of the intermediate circuit voltage is particularly suitable if linear motors are used as servomotors, for example for stretching rod movement control.

In another suitable embodiment, two-phase or even multi-phase current is used for the respective electric servomotor. This results in higher usable power, in particular in case of linear motors.

In one suitable embodiment of the stretch-blow molding machine, intermediate circuits of frequency converters in the rotating part are electrically coupled with intermediate circuits of frequency converters in the stationary part, and preferably at least one energy storage for supplying at least the servomotors in the rotating part in case of a power outage can be provided in the stationary part. Due to the energy storage provided in the stationary part, an energy storage in the rotating part can be dispensed with in order to be able, e.g. in case of a power outage, to accomplish a controlled reset of all components, and after the power outage has been removed, to immediately continue production.

In an alternative embodiment, at least one energy storage, preferably a flywheel, a capacitor bank or a battery or the like, is placed in the rotating part to be able to perform a reset to the required starting positions despite a power outage (controlled shutdown of the system), so that no damages occur when production is started again. The disadvantage of the autonomously operated and controlled electric servomotors, for example for stretching rod movement control, is thus easily eliminated as to the control.

In a suitable embodiment, drive axles of the stationary part are electrically coupled with drive axles, preferably electric drives, in the rotating part. This coupling makes e.g. a transmitter in the rotating part dispensable.

As an alternative, however, at least one transmitter can be placed in the rotating part and utilized for controlling at least one electric servomotor depending on the transmitter signal.

The respective frequency converter should be suitably designed in STO and/or SLS technology. STO technology (safe torque off) serves personal protection, while SLS technology (safe low speed) can be suitably utilized e.g. when the molds are changed.

Electric servo drives and attached transmitter systems are often also subject to certain leakages or non-linearities. For example in linear motors, transmitters which are integrated in the motor winding can be employed. These transmitters are inexpensive and robust, but have a disadvantage in that the signals must be linearized to achieve the required accuracy. As the determination of the motor-specific parameters for linearization can be quite complex, it is advantageous to measure the transmitter already at the manufacturer's site and to print the parameters onto the type label. This facilitates the replacement of the motor in case of spare parts. The parameters must only be read off and entered into the machine's operation unit.

However, it is also possible to store the parameters in a memory. The transmitter systems often have integrated micro processors and memories, which is why it offers itself to use these memories for this, as well. The memory could be read out by the servo converter to automatically adopt the parameters. If spare parts are required, no further operation by the person who carries out maintenance is required. In such memories, one talks of so-called electronic type labels.

Equally, the parameters could be automatically determined by automatic calibration when the motor is installed by traversing the stretching axle over the complete length. Equally, by such a method, the optimal control parameters can be determined, where multiple manual iteration loops are eliminated. By the automatic measurement of the motor and its controlled system, systems tend less to oscillate and can be better optimized.

Another variant is the automatic detection of the motor type. Often, different motor types are employed depending on the size of the machine. Their specific motor parameters could also be read out from the electronic type label. This "plug-and-play" principle makes manual configuration superfluous.

In one suitable embodiment, a central lubrication device for all blow molding stations is provided in the rotating part of the stretch-blow molding machine which supplies preferably mainly mechanical components that can be moved relative with respect to each other with metered lubricant. This increases the production intervals between maintenance cycles and ensures a uniform functionality and a long service life of the mechanical equipment components.

In one suitable embodiment of the stretch-blow molding machine, the electric servomotor of the stretching rod drive system embodied as rotary motor is connected with a stretching slide coupled with the stretching rod, either via a threaded spindle, preferably a ball threaded spindle, or via a cable chain to transmit the rotary movement of the servomotor into the linear movement of the stretching rod. In the process, the servomotor and the control unit are mounted on a bearing support, preferably via a heat sink, which comprises at least one linear guide for the stretching slide. The screw spindle or the cable chain ensure a transmission of movements and force free from backlash. This group of components of the blow molding station can be completely prefinished and its function can be checked.

In one suitable embodiment, the bearing support comprises a U-profile open at one longitudinal side in which the threaded spindle and the linear guide are arranged inside. In contrast, the stretching rod is arranged at the rear side facing away from the open longitudinal side of the U-profile, which is advantageous for changing the stretching rod as it is better accessible. The stretching slide grips around the outside of the U-profile and engages inside the U-profile for coupling with the threaded spindle and for linear guidance. The design of the bearing support is dimensionally stable. The arrangement of the individual components at the bearing support reduces eccentric forces in the movement control of the stretching rod.

Especially in a rotary-type stretch-blow molding machine, at least one driver rod for a blow molding slide arranged at a distance to the stretching slide and comprising the blow nozzle can be arranged at the stretching slide, and it can be coupled to the stretching slide via a driver coupling acting only in one moving direction of the stretching slide, preferably in the return stroke direction. This mechanical coupling of the blow nozzle movement with the stretching slide movement is, as was mentioned, especially suitable in a rotary-type stretch-blow molding machine because in case of an early return stroke of the stretching rod, for example initiated by the pressure in the blow mold before it is vented, the stretching slide displaced by the stretching rod supports itself at the blow molding slide via the driver coupling, while the servo drive motor can be de-energized or suitably even recover energy in a generator-based operation.

In another suitable embodiment, the servomotor embodied as linear motor has a tubular design with respect to its rotor, forming a direct drive for the stretching rod coaxial or at least essentially coaxial with respect to the stretching rod. Though a flat linear motor could also be used, the advantage of a linear motor having a tubular design is that uncontrolled starting powers are avoided. A coaxial arrangement of the direct drive avoids moments on the linear guide, for example of the stretching slide.

In one suitable embodiment, however, the rotor of the linear motor is laterally offset with respect to the stretching rod by no more than about 100 mm. This slight offset on the one hand only conditions moderate moments in the linear guidance of the stretching slide and between the rotor and the stretching rod, but is advantageous with respect to a quick and trouble-free change of the stretching rod.

Moreover, the use of a linear motor, in particular in tubular design, in combination with the electronic control unit offers the possibility of controlling the path, the force and the pressure, or only the force and the path of the stretching rod. Here, path control is suitably performed until shortly before the end of the stretching process, and then, at the end of the stretching process, mere force control is employed, e.g. to exactly define the overpressing of the container bottom.

A generator-based operation of the electric servomotor, in particular in the form of a linear motor, especially in tubular design, makes it possible to recover electric energy, for example already from the inertia of masses or the weight of the stretching rod drive system, and/or from the lifting force at the stretching rod resulting from the pressure in the blow mold. Even if the amount of recovered electric energy is small compared to the employment of primary energy, a remarkable total energy saving nevertheless results in the often many blow molding stations and at a high production frequency.

In one suitable embodiment of a linear motor in tubular design, the rotor is guided with respect to the stator by guide rings in the stator or at both ends of the stator, or by at least one guide sleeve continuously or partially continuously integrated in the stator, or even by at least one guidance arranged outside of the stator. The external guidance can comprise, for example, two spaced guide members at one linear guidance. This selective guidance of the rotor contributes to precisely generate high forces and to reduce wear between the rotor and the stator, or to minimize parasitic friction losses.

In one suitable embodiment of the blow molding machine with a linear motor in the stretching rod drive system, at least for partially compensating restoring forces due to the blow pressure in the blow mold acting on the stretching rod, an energy storage mechanism, such as a spring or a pneumatic cylinder, can be provided and assist the linear motor or keep off force peaks from it. The energy storage mechanism can preferably be even actively controlled, depending on the respective process phase and/or the stretching rod position. The energy storage permits smaller dimensions of the servomotor and equalizes return stroke forces at the stretching rod by the pressure in the container in the blow mold.

The linear motor, preferably in tubular design, and the control unit of the blow molding station are preferably mounted on a bearing support which preferably also supports the valve section. At least the linear motor can be mounted there via a heat sink which eliminates heat generated in operation. The linear motor can comprise cooling ribs or air guide sheets for cooling e.g. by selective air flows. The bearing support comprises a linear guidance for the stretching slide at which the stretching rod passing through a blow molding slide that can be linearly adjusted relative to the stretching rod is coupled with the rotor, preferably in a releasable manner. The bearing support with the components mounted on it can be prefinished and checked for its function before its final assembly.

In one suitable embodiment, a preferably adjustable and/or spring-mounted stop for the stretching slide is arranged at the bearing support, which for example defines the stop position of the stretching rod after the return stroke and/or can be utilized for referencing or calibrating.

In a further suitable embodiment, also of a rotary-type stretch-blow molding machine, a lifting member is arranged in the rotating part at the blow molding slide to which a catch cam is associated in the blow molding station which cooperates with the lifting member in the rotary movement of the rotating part. The lifting member is, for example, a driver roller. By means of the lifting member, the blow molding slide can be lifted from the blow mold over a predetermined stroke to vent the valve section in case of an error of a blow-off valve.

In one suitable method variant, the speed of the stretching rod movement during a cycle in the production operation up to the position of the free stretching rod end in the mold cavity bottom is changed at least twice, and this without return of movement. The speed can here be path-controlled and/or force-controlled and/or time-controlled. These multiple speed changes during the stretching process contribute to an improvement of the process and thus to the final quality of the containers.

In a further suitable method variant, the speed is changed depending on the blow pressure, or the respective speed is adjusted depending on the blow pressure. The same applies to the mass flow rate of the blow air (air flow rate), which results from the blow pressure and the used line cross sections.

Furthermore, it can be suitable for the process to displace the stretching rod, which was displaced during the cycle for the stretching process by means of the linear motor, with the blow pressure in the blow mold in the return stroke, and to either de-energize the linear motor or to operate it as a generator and have it driven by the stretching rod.

Furthermore, it can be suitable if the blow molding slide is taken along by the stretching rod or the stretching slide at least over a portion of the return stroke in the process, or if the stretching slide is terminated by the blow molding slide during the return stroke of the stretching rod while the servomotor is then de-energized, while the blow molding slide is at this point in time mechanically locked in the blow molding station and can easily absorb even high forces.

The use of the computerized electronic control unit in the blow molding station permits to record and visualize directly at the control unit or at an external master control system the stretching path, the stretching force, the blow pressure, the stretching speed and the like each in a separate diagram, e.g. over time, or the angle of rotation of the rotating part (for example in a touch screen), or to superimpose it on the blow curve recording. This provides the operator with additional information for precise process control and optionally for suitable correction measures. Envelopes or limiting values for such parameters can also be entered, or suggested values with a certain tolerance range of for example ±10% can be automatically visualized by the control unit. An envelope can be used, for example, to automatically discard a produced container when the envelope is exceeded or not reached. The path control of the stretching rod can furthermore be coupled to a signal, for example to the signal which represents a valve switching or a pressure increase. This offers the advantage of compensating varying valve switching times in the production process.

BRIEF DESCRIPTION OF THE DRAWINGS

Embodiments of the subject matter of the disclosure will be illustrated with reference to the drawings. In the drawings.

DETAILED DESCRIPTION OF THE PREFERRED EMBODIMENT

Figure 1:
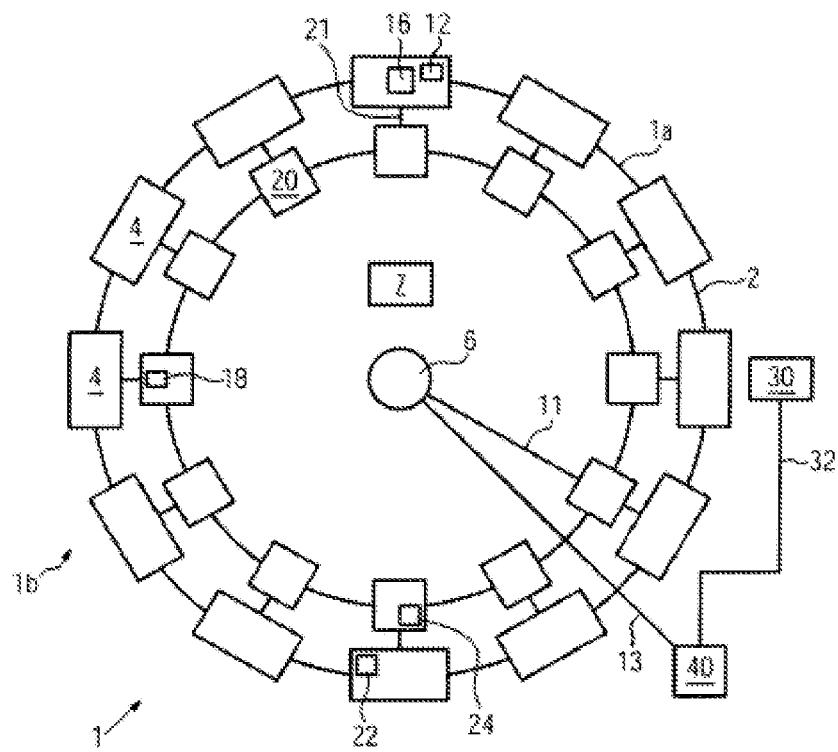
FIG. 1 shows a schematic plan view of a stretch-blow molding machine (rotary machine)

FIG. 1 schematically shows a stretch-blow molding machine 1 for stretch-blow molding containers from preforms. The stretch-blow molding machine 1 is a rotary-type machine with a blow-molding unit 2 supporting blow-molding stations 4 at its periphery which represents a part 1*a* rotating in relation to a stationary part 1*b*. The concept according to the disclosure, however, can be used without restrictions for stretch-blow molding machines in which the blow molding stations are arranged stationarily (not shown).

For at least one blow molding station 4, one electronic control unit 20 each is arranged on the blow-molding unit 2 in FIG. 1. The power supply of the control units 20 is accomplished e.g. via connection lines 11 and a rotary transmission leadthrough 6, e.g. a slip ring arrangement and/or a medium leadthrough, in the center of the blow-molding unit 2. Each blow molding station 4 has a stretching rod drive system, here with an electric servomotor 16, and a valve section 12 optionally with several valves for controlling the blow air supply during the blowing process. Furthermore, at each blow molding station 4, at least one sensor 22 can be provided which can be in communicating connection with the respective control unit 20 as transmitter. As further electronic equipment, a timer 24 is optionally provided in each case which can initiate a cycle, for example in response to a starting signal. Furthermore, at least one sensor 30 can be provided as position transmitter for detecting an angular position of the blow-molding unit 2. A central control system 40 can be arranged in the stationary part 1*b* and be connected, for example, with the sensor 30 via a communication link 32. Furthermore, a communication link 13 can be provided, e.g. for transmitting a starting signal to the respective control unit 20. In at least one control unit 20, a memory and/or input and/or display section 18 can be provided to store, read out, and the like, data. Each control unit 20 communicates with the blow molding station 4 or at least the stretching rod drive system A or the servomotor 16, which is employed for electric stretching, via a link 21.

The electric servomotor 16 could be combined with an energy storage mechanism or a pneumatic cylinder (not shown) which assists in the stretching process or interferes and is optionally also controlled by the control unit 20.

As an alternative, a cam control combined with a pneumatic cylinder for controlling the stretching process could be provided for each blow molding station 4 (not shown), where here, too, the control at least of the pneumatic cylinder is accomplished by the control unit 20 during the stretching process. The respective control unit 20 can thus be universally used in different stretch-blow molding machines and is equipped with hardware and software technology to selectively control at least one blow molding station 4 independent of the type of the stretching rod drive system. Furthermore, the control unit 20 can be designed such that it also controls the pressure application in the blow molding process and/or the required adjustments of a blow nozzle and other components.

At the blow-molding unit 2, a central lubrication device Z is furthermore indicated which supplies mechanical components at the blow-molding unit with lubricant, e.g. meters the lubricant.

Figure 4:
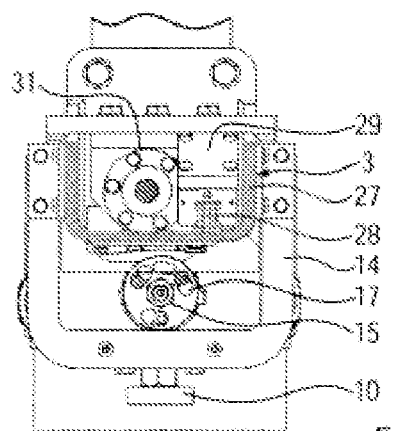
FIG. 4 shows a cross-section of the blow molding station of FIGS. 2 and 3.
Figure 2:
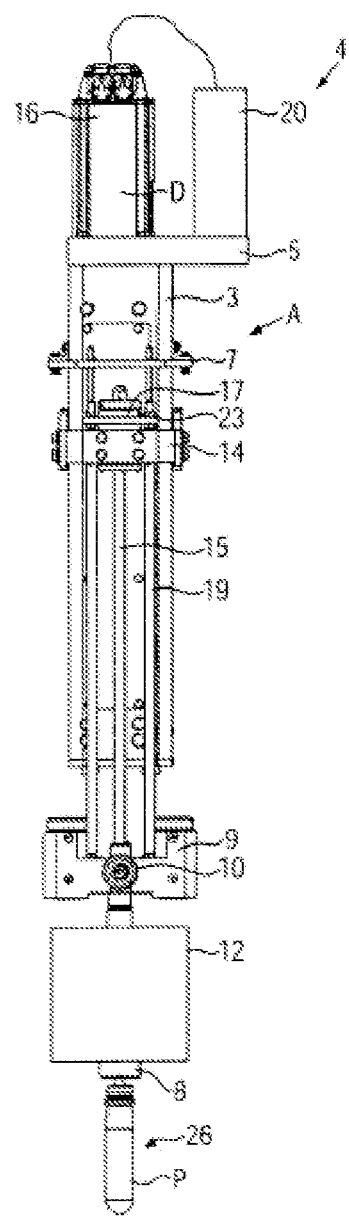
FIG. 2 shows a front view of a blow molding station with indicated main components.
Figure 3:
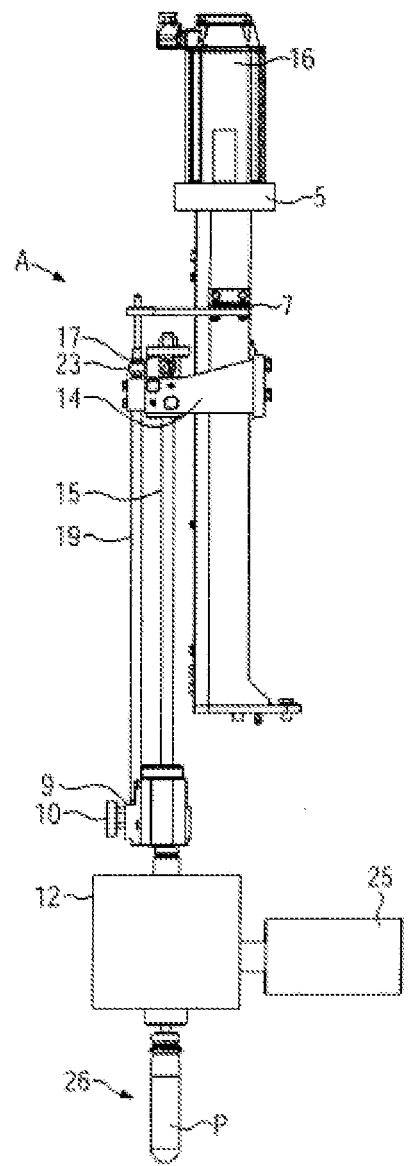
FIG. 3 shows a side view of the blow molding station of FIG. 2.

FIGS. 2, 3 and 4 are associated views of an embodiment of a blow molding station 4 with a stretching rod drive system A, where, however, only main components are represented.

A bearing support 3 mounted at the blow-molding unit above a split blow mold 26 (not shown in detail), in this embodiment of the blow molding station 4 for electric stretching, supports the electric servomotor 16 designed as rotary motor D and, separate from it, the control unit 20. The servomotor 16 and the control unit 20 are installed, for example, via a heat sink 5 on the head of the bearing support 3 which is embodied (FIG. 4) over a considerable part of its length as U-profile 27. At the bearing support 3, a stop 7 for a stretching slide 14 coupled with a stretching rod 15 can be provided which is preferably adjustable and/or spring-mounted. The stretching rod 15 is fixed in the stretching slide 14 via a releasable coupling 17 and extends downwards, parallel to the bearing support 3, to the blow mold 26, where at this position a preform P is shown from which a container with the shape of the mold cavity of the blow mold 26 is manufactured in the production process of the stretch-blow molding machine 1 by superposing a stretching process and a blow molding process. The stretching rod 15 penetrates a blow molding slide 9 to which a blow piston or a blow nozzle 8 is connected which can be lifted relative to the blow mold and lowered onto the mouth of the preform P until it seals the same. The blow mold 26 comprises (not shown) for example two mold halves and one mold bottom, where at least the mold halves are arranged in supports which can be moved by a non-depicted mechanism to open and close the blow mold 26 and lock it in the closed state. Upon completion of the locking phase, in the production process, the blow nozzle 8 is placed onto the preform mouth P before pressure is applied via the valve section 12, for example to carry out a preblow phase with a lower pressure level and subsequently a final blow phase with a high pressure level, superimposed by the stretching process by the stretching rod 15 which is inserted into the blow mold.

From the stretching slide 14, at least one driver rod 19 extends to the blow molding slide 9, where the driver rod 19 can be coupled with the stretching slide 14 in its return stroke direction of the stretching rod 15 via a driver coupling 23, for example either to lift the blow molding slide 9 or to stop the stretching slide 14 in relation to the then mechanically blocked blow molding slide 9. The stop 7 can be utilized, for example, for calibrating the stretching rod drive system A.

The servomotor 16 is connected with the stretching slide 14 via a threaded spindle 31 which is arranged inside the U-profile 27 and can also be supported there. The stretching slide 14 comprises the U-profile 27 and engages with a coupling 29 inside the U-profile 27 and also a linear guidance 28 arranged there. The stretching rod 15 is arranged at the rear side of the bearing support 3 facing away from the open longitudinal side of the U-profile 27 and, as mentioned, connected with the stretching slide 14 via the releasable coupling 17 to be able to conveniently and quickly change the stretching rod.

FIG. 4 also shows a lifting member 10 (see also FIGS. 2 and 3) at the blow molding slide 9. This lifting member is, for example, a driver roller 10 which can cooperate with a non-depicted catch cam to lift the blow molding slide 9, for example to vent the container finished in the blow mold 26 in case an outlet valve to a sound absorber 25 at the valve section 12 does not work properly.

The movement of the blow molding slide 9 is controlled by a non-depicted cam control, or as an alternative by a servomotor and in timely or path-dependent association to the mechanism which controls the locking phase of the blow mold 26.

The threaded spindle 31, preferably a ball screw spindle, which is lubricated, for example, by the central lubrication device Z indicated in FIG. 1, converts the rotary movement of the servomotor 16 into the linear movement of the stretching slide 14. The control unit 20 controls an exactly predeterminable movement sequence during the stretching process, so that the free end of the stretching rod that also penetrates the valve section 12 drives to and through certain positions, that is a first position in which the free end of the stretching rod 15 is approached to the preform bottom up to about 1.0 mm or even contacts the preform bottom, or an even deeper position in which the preform is already pre-stretched, and finally an end position near the mold cavity bottom without contacting the mold cavity bottom. The movement of the stretching rod 15 can be path-controlled or force-controlled, where one can switch from path control to force control or vice-versa even during a cycle in the production operation. The speed of the stretching rod 15 can be changed e.g. at least twice without return of movement.

Figure 5:
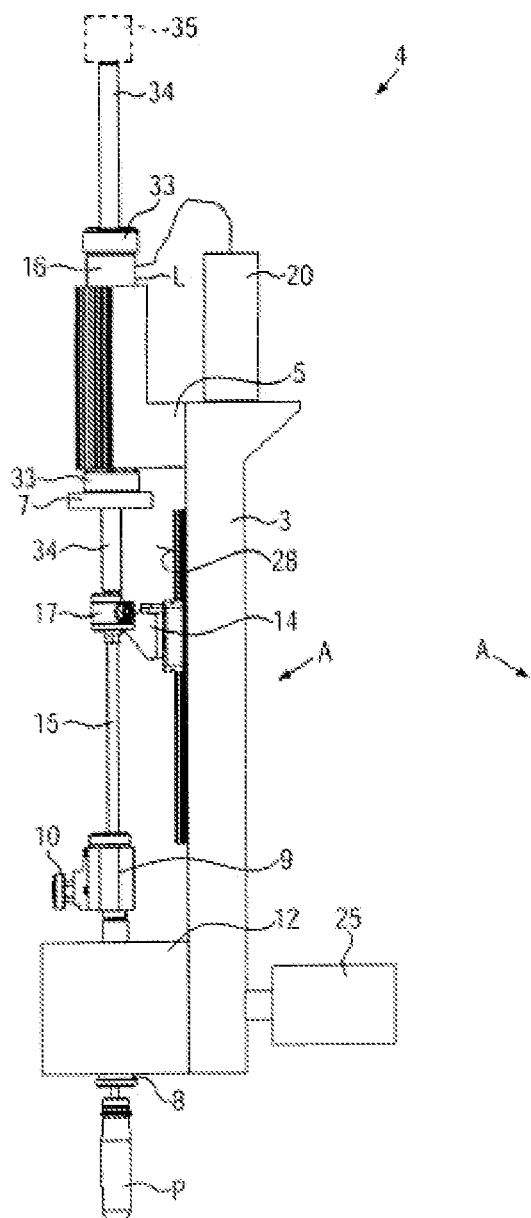
FIG. 5 shows another embodiment of a blow molding station with main components.
Figure 6:
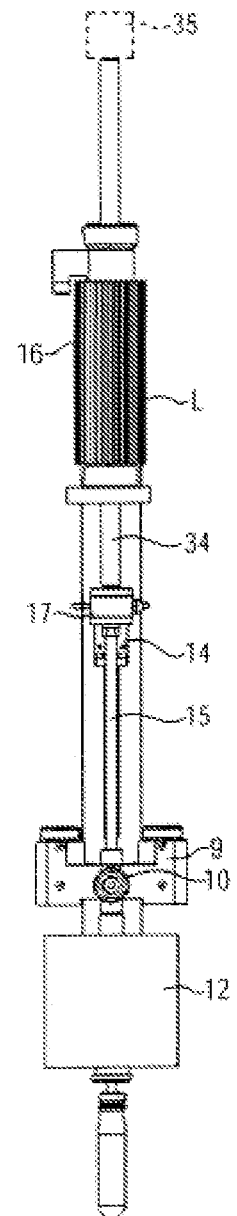
FIG. 6 shows a front view of the blow molding station of FIG. 5.

FIGS. 5 and 6 show another embodiment of the blow molding station 4 with a stretching rod drive system A for electric stretching, where the servomotor 16 here is a linear motor L, preferably a linear motor L in tubular design. As an alternative, a linear motor L in another construction, e.g. a flat construction, could also be used. The linear motor L forms a direct drive of the stretching rod 15 with its rotor 34. The linear motor L is installed on the head of the bearing support 3 together with the control unit 20 but separated from the latter, preferably with a heat sink 5 at least for the linear motor L being inserted. In this embodiment of the linear motor L, the rotor 34 is linearly guided in guide sleeves 33 at both ends of the linear motor and coaxial to the stretching rod 15, where the rotor 34 and the stretching rod 15 are coupled to each other in the region of the stretching slide 14 via the releasable coupling 17. The stretching slide 14 is guided at a linear guidance 28 which is mounted at the side of the bearing support 3 facing the stretching rod 15. The stretching rod 15 penetrates the blow molding slide 9, which can be equipped with the lifting member 10, the blow nozzle 8 and the valve section 12. The valve section 12 is in this embodiment mounted at the bearing support 3, as also is a sound absorber 25 which is associated to a non-depicted outlet valve of the valve section 12.

In FIGS. 5 and 6, an energy storage mechanism 35 is indicated in a dashed line, e.g. a spring or a pneumatic cylinder, which is in driving connection with the rotor 34 and assists the linear motor L or/and generates certain force progressions or absorbs or compensates forces which act on the stretching rod 15 in the direction of the return stroke, for example from the pressure in the manufactured container when the blow mold is not yet vented.

In this embodiment, the stretching rod 15 can perform its return stroke utilizing this pressure in the blow mold, for example until it is terminated by the blow molding slide 9 or by the stop 7 at the bearing support, or by a counter-force of the energy storage mechanism 35 or the linear motor, respectively. Moreover, the linear motor L can be de-energized during the return stroke or run in a generator-based operation and recover energy.

Figure 8:
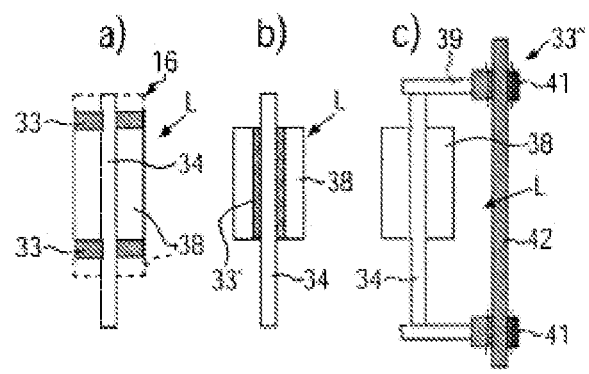
FIG. 8 shows three detail variants in a schematic representation of a tubular linear motor.

The tubular design of the linear motor L as servomotor 16 in FIGS. 5 and 6 is schematically shown with reference to FIG. 8 which shows three variants a), b) and c).

In variant a) in FIG. 8, similar to FIG. 5, at both ends of a stator 38, guide sleeves 33 are arranged which guide the rotor 34 centrally in the stator 38. These guide sleeves 33 could also be integrated inside the stator 38 (indicated in a dashed line).

In variant b) in FIG. 8, a continuous guide sleeve 33' is integrated in the stator 38 which here extends over the total length of the stator 38 and has a smaller outer diameter than the stator 38. The stator 38 is moreover embodied with a largely circular cross-section. The guide sleeve 33' could extend only over a portion of the length of the stator 38 or be divided, for example, in two shorter guide sleeves.

In variant c) in FIG. 8, a guidance 33" for the rotor 34 situated externally with respect to the stator 38 is provided. The rotor 34 is guided, for example, via two supports 39 and guide sleeves 41 at a linear guidance 42. In variant c) in FIG. 8, the rotor 34 could also be guided only at one end.

As mentioned, the linear motor L with its rotor 34 forms a direct drive coaxial to the stretching rod in FIGS. 5 and 6. However, it would also be possible (not shown) to laterally offset the rotor 34 with respect to the stretching rod 15, for example by no more than 100 mm, to offer better conditions for changing the stretching rod.

Figure 7:
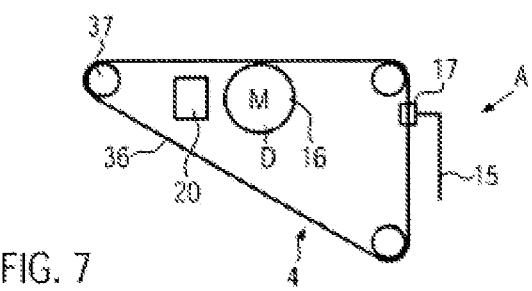
FIG. 7 shows a schematic representation of another drive principle of a stretching rod in a stretching rod drive system of the blow molding station.

FIG. 7 schematically illustrates another embodiment of the stretching rod drive system A with a servomotor 16 which is designed as rotary motor D and controlled by the control unit 20. The rotary movement of the servomotor 16 is transmitted to the stretching slide 17 and thus to the stretching rod 15 e.g. via a cable chain 36 which is placed in a here closed loop over deflection rollers 37.

The stretching process in electric stretching is controlled by means of the servomotor 16 such that the stretching rod is inserted into the preform or the blow mold 26 in the production process during the stretch blow molding of a container from a preform P at the latest with the beginning of the locking phase or during the locking phase of the blow mold 26, optionally even already before the locking phase has started, when a non-depicted transfer arm with the preform P moves on the same path as the blow mold 26 while the blow mold is still opened, and this first to about 1.0 mm in front of the preform bottom or even until it contacts the preform bottom, before the blow nozzle 8 is placed on the preform mouth in a sealing manner and the preblow process is initiated. The stretching rod 15 can be even further inserted and have already started the pre-stretching of the preform P as soon as the blow nozzle has been placed on the preform mouth. Then, the stretching rod 15 is further displaced close to the mold cavity bottom simultaneously with the preblow phase in which about 90% of the container shape is finally blown, where in the subsequent final blow phase with an even higher blow pressure, the stretching rod can even perform an after-pressing of the container bottom. The control of the stretching rod movement is either path-controlled or force-controlled by the control unit 20, and optionally depending on the blow pressure control, where, as mentioned, during a cycle in the production process, one can even switch between path control and force control.

The correct positions of the stretching rod during the stretching process are predetermined by the control unit 20, as is the speed which is suitably changed at least twice during the stretching process, and this either by a preceding calibration operation for obtaining parameter values for the control unit 20 and/or by entering parameters depending on the respective preform and/or container type. During calibration, the stop 7 can also be used.

The power supply of the stretching rod drive system A for electric stretching is, for example, accomplished by a slip ring arrangement of the rotary transmission leadthrough 6 in FIG. 1, where (FIG. 9) a frequency converter 43 is associated at least to the servomotor 16 of the blow molding station 4, which is separated from the servomotor 16 at a distance or even installed in a central installation point in the blow-molding unit 2, and which applies supply voltage to the servomotor 16 via connections 47, the supply voltage being generated and maintained in an intermediate circuit 45 of the frequency converter 43 independent of the nominal voltage supplied by the connections 44 or the mains voltage. In the intermediate circuit 45, a closed-loop-controlled set-up switched-mode power supply 46 is provided which sets up and maintains the intermediate circuit voltage to about 600 Volt to 900 Volt, independent of the nominal voltage. A particularly suitable set-up range is between about 750 Volt and 800 Volt for supplying the servomotor 16 and for controlling the speed thereof. The intermediate circuit voltage can be maintained by means of the closed-loop-controlled set-up switched-mode power supply 46 independent of the nominal voltage, so that a servomotor adapted to this higher intermediate circuit voltage can be employed, independent of mains voltages possibly varying depending on the country. The set up intermediate circuit voltage results in less dissipated power and smaller cable cross-sections. Furthermore, such servomotors 16 can be operated at higher speeds (than the rotary motor D), without the torque dropping. This also applies to a linear motor L. Suitably, the frequency converters 43 are electrically connected in the rotating part 1*a* via couplings, so that all servomotors 16 utilize the same set up intermediate circuit voltage. Furthermore, with reference numeral 50 in FIG. 9, an energy storage is schematically arranged in the rotating part 1*a*, for example a flywheel, a capacitor bank, a battery, or the like. The energy storage 50 serves to perform a correct reset of all movable components of the blow molding stations in case of a power outage to prevent damages when the system is restarted.

Figure 9:
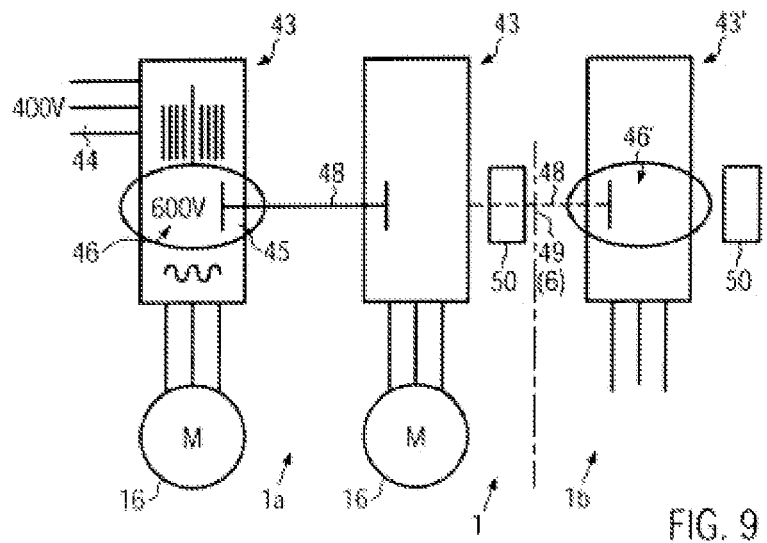
FIG. 9 shows a schematic representation of electric components in the stretch-blow molding machine.

It is furthermore indicated in FIG. 9 that the frequency converters 43 in the rotating part 1*a* are electrically coupled with frequency converters 43' for other servomotors in the stationary part 1*b* via the rotary transmission leadthrough 49 or the slip ring arrangement 6 via electric couplings 48, where in the stationary part, an energy storage 50 (instead of the energy storage 50 shown in the rotating part) is provided to be able to also shut down the servomotors 16 in the rotating part 1*a''* in a controlled manner in case of a power outage, e.g. to speed zero, and to be able to adjust starting positions. In this manner, for example electric drive axles in the rotating part are coupled with electric drive axles in the stationary part.

Electric servo drives and attached transmitter systems are often also subject to certain leakages or non-linearities. For example, in linear motors, transmitters can be employed which are integrated in the motor winding. These transmitters are inexpensive and robust, but have a disadvantage in that the signals must be linearized to achieve the required accuracy. As the determination of the motor-specific parameters for linearization can be quite complex, it is advantageous to measure the transmitters already at the manufacturer's site and to print the parameters onto the type label. This facilitates the replacement of the motor in case of spare parts. The parameters must only be read off and entered into the machine's operation unit. However, it is also possible to store the parameters in a memory. The transmitter systems often have integrated micro processors and memories, which is why it offers itself to use these memories for this, as well. The memory could be read out by the servo converter to automatically adopt the parameters. If spare parts are required, no further operation by the person who carries out maintenance is required. In such memories, one talks of so-called electronic type labels. Equally, the parameters could be automatically determined by automatic calibration when the motor is installed by traversing the stretching axle over the complete length. By such a method, the optimal control parameters can also be determined, where multiple manual iteration loops are eliminated. By the automatic measurement of the motor and its controlled system, systems tend less to oscillate and can be better optimized. Another variant is the automatic detection of the motor type. Often, different motor types are employed depending on the size of the machine. Their specific motor parameters could also be read out from the electronic type label. This "plug-and-play" principle makes manual configuration superfluous. The structural and functional features in this respect are not pointed out in the figures though they are part of the disclosure.

The invention claimed is:

1. Stretch-blow molding machine, comprising: at least one blow molding station having at least one split blow mold, an adjustable blow nozzle with a clock-controlled valve section, a linearly moveable stretching rod driven by a clock-controlled stretching rod drive system, and a universal electronic control unit for controlling at least the stretching rod drive system provided in the blow molding station, the stretching rod drive system comprising either one of a combination of a cam drive and a pneumatic drive, a combination of an electric servo drive and a pneumatic drive, or only an electric servo drive, wherein the universal electronic control unit is equipped with hardware and software technology for selectively operating any of said stretching rod drive systems.

2. Stretch-blow molding machine according to claim 1, wherein the control unit is additionally equipped with hardware and software technology for controlling the blow nozzle and/or the valve section in the blow molding station.

3. Stretch-blow molding machine according to claim 1, wherein the blow molding station is arranged in a blow-molding unit comprising several blow molding stations rotating relative to a stationary part of the stretch-blow molding machine.

4. Stretch-blow molding machine according to claim 1, wherein the control unit is installed in the blow molding station separately from the electric servo drive.

5. Stretch-blow molding machine according to claim 4, wherein a frequency converter of the electric servo drive, comprising a servomotor in the form of a rotary motor or a linear motor, is separated from the servomotor by a distance excluding heat coupling from the servomotor to the frequency converter, or at a central installation point containing several to all frequency converters for several blow molding stations of the stretch-blow molding machine.

6. Stretch-blow molding machine according to claim 4, wherein a frequency converter of an electric servo drive, in an intermediate circuit comprises at least one controlled set-up switched-mode power supply by means of which an intermediate circuit voltage set up to between about 600 to 900 Volt for supplying the electric servomotor adapted to the set-up intermediate circuit voltage can be generated and maintained independent of the mains voltage applied to the frequency converter.

7. Stretch-blow molding machine according to claim 3, wherein intermediate circuits of frequency converters for electric servomotors in the rotating blow molding unit are electrically coupled with intermediate circuits of frequency converters for electric servomotors in the stationary part, and that at least one energy storage for supplying at least the electric servomotors in the rotating blow molding unit in case of a power outage are provided in the stationary part.

8. Stretch-blow molding machine according to claim 6, and wherein at least one energy storage being one a flywheel, a capacitor bank, or a battery, for supplying at least the electric servomotors in the rotating blow molding unit in case of a power outage are provided in the rotating blow molding unit.

9. Stretch-blow molding machine according to claim 3, wherein drive axles refining electric drive systems of the stationary part are electrically coupled with drive axles defining electric drive systems in the rotating blow molding unit.

10. Stretch-blow molding machine according to claim 3, wherein at least one transmitter for controlling at least one electric servomotor in the rotating blow molding unit is provided in the rotating blow molding unit.

11. Stretch-blow molding machine according to claim 7, wherein the stretching rod drive system comprises at least one electronic type label for storing at least motor-specific parameters of the electric stretching rod servomotor that can be read out by a frequency converter of the electric stretching rod servomotor.

12. Stretch-blow molding machine according to claim 1, wherein the servomotor of the stretching rod drive system is a rotary motor is connected with a stretching slide coupled with the stretching rod either via a threaded ball spindle (31), or via a cable chain, and that the servomotor and the control unit are mounted on a bearing support comprising at least one linear guidance for the stretching slide.

13. Stretch-blow molding machine according to claim 12, wherein the bearing support comprises a U-profile open at one longitudinal side, inside of which the threaded ball spindle and the linear guidance are arranged, wherein the stretching rod is arranged at the rear side of the U-profile facing away from the open longitudinal side of the U-profile, and wherein the stretching slide grips around the U-profile from outside and engages from the open longitudinal side to the linear guidance to the inside of the U-profile to a coupling with the threaded ball spindle.

14. Stretch-blow molding machine according to claim 12, wherein at least one driver rod for a blow molding slide arranged at a distance to the stretching slide and comprising the blow nozzle is arranged at the stretching slide and can be coupled with the stretching slide via a driver coupling acting only in one moving direction of the stretching slide.

15. Stretch-blow molding machine according to claim 1, wherein the servomotor of the stretching rod drive system designed as linear motor has a tubular design with respect to its rotor and forms one of a coaxial or essentially coaxial direct drive of the stretching rod.

16. Stretch-blow molding machine according to claim 15, wherein the rotor of the linear motor is arranged with respect to a longitudinal axis of the stretching rod laterally offset by no more than 100 mm.

17. Stretch-blow molding machine according to claim 15, wherein the rotor is guided with respect to a stator of the linear motor by one of guide rings in the stator or at both ends of the stator, or at least one guide sleeve integrated in the stator, or at least one guidance arranged outside the stator.

18. Stretch-blow molding machine according to claim 15, wherein the linear motor is embodied for a temporary generator-based operation with energy recovery.

19. Stretch-blow molding machine according to claim 1, wherein with the electric servomotor, the stretching rod can be selectively one of force-controlled or path-controlled by the control unit in one and the same cycle in a production process.

20. Stretch-blow molding machine according to claim 15, wherein the linear motor and the control unit are mounted on a bearing support also supporting the valve section (12), and wherein the bearing support comprises a linear guide for the stretching slide at which the stretching rod is coupled with the rotor.

21. Stretch-blow molding machine according to claim 5, wherein the central installation point is a cooled switch cabinet.

22. Stretch-blow molding machine according to claim 6, wherein the intermediate voltage set up is between about 750 to 800 volt.

23. Stretch-blow molding machine according to claim 15, wherein the bearing support is a heat sink.

24. Stretch-blow molding machine according to claim 17, wherein the at least one guidance arranged outside the stator comprises two spaced guide members and a linear guide.

* * * * *